July 27, 1954
L. A. PAINE
2,685,080
SUPERVISORY WARNING INDICATOR FOR
PLURAL CIRCUITS AS IN METERS
Filed Jan. 26, 1950
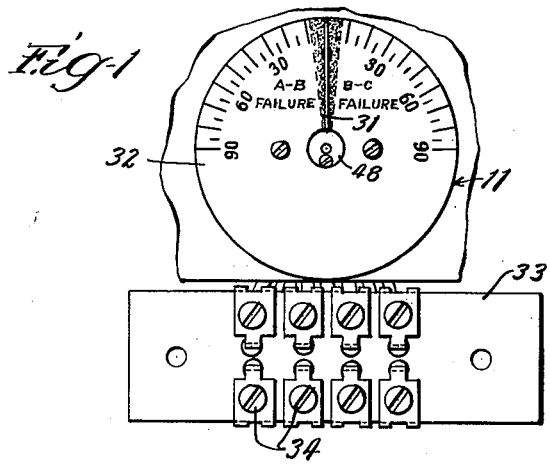
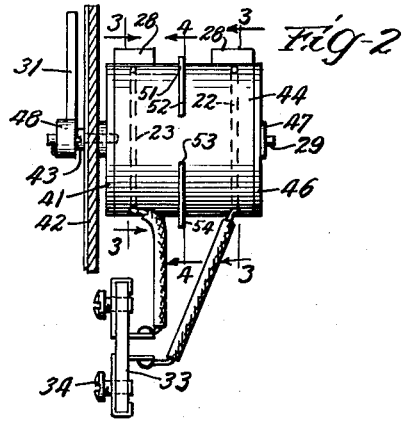
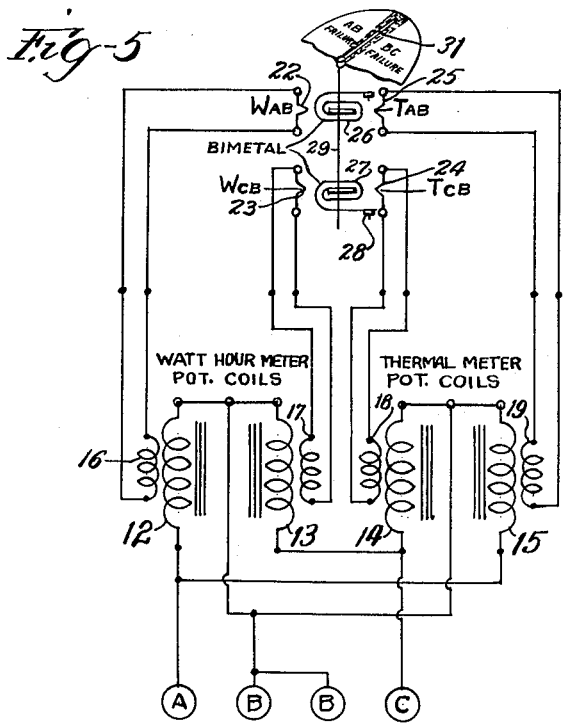
Inventor
Louis A. Paine
By:—
Louis Robertson
Atty.

Patented July 27, 1954

2,685,080

UNITED STATES PATENT OFFICE 2,685,080

SUPERVISORY WARNING INDICATOR FOR PLURAL CIRCUITS AS IN METERS

Louis Arthur Paine, West Lafayette, Ind., assignor to Duncan Electric Manufacturing Company, Lafayette, Ind., a corporation of Illinois Application January 26, 1950, Serial No. 140,668

12 Claims. (Cl. 340—248)

In many electric meter installations in which the meter will continue to operate even if one of the coils has ceased to function, it is important to have an indicator so that the meter reader will detect any such failure. For example, in a polyphase meter, the rotating structure will be driven even if one of the voltage coils has been burned out or its circuit broken by lightning striking outside wires. Hence when the meter reader appears, the meter seems to be functioning properly if no indicator shows that one coil has failed.

It is common practice to provide an indicator associated with each of the potential coils. The preferred indicators heretofore have been electromagnetic devices. Two such devices naturally represent an appreciable cost and require a substantial amount of space within the meter cover. These difficulties have usually been tolerated heretofore, but become more severe when more coils are added. For example, in a polyphase combined watt hour and thermal demand meter, there are four potential coils, any one of which might be open circuited by a lightning surge. The cost of four indicators and the necessity of looking at all four of them might both be deemed intolerable. Even more important is the fact that a meter of this type leaves almost no available space within the meter cover, a cover of conventional diameter being greatly preferred.

According to the present invention, a single indicator is provided which will indicate a failure in any of the four potential coils. It could be used for any smaller number of coils and the principle could be expanded for use with a larger number of coils. The principle finds its greatest utility with an even number of coils.

This outstanding simplification is accomplished by providing a thermal indicator with oppositely acting thermally responsive units such as bi-metallic coils, the thermal units being influenced by heaters, each of which is responsive to one of the potential coils. The opposite winding of the bi-metallic coils renders the indicator immune to ambient temperature variations and permits the heaters to be so arranged that if all the potential coils are functioning, the indicator pointer will stay at the central zero position. If any potential coil fails, its associated heater will cease to be energized and the bi-metallic coils will be thrown out of balance so that the pointer of the indicator will be swung decidedly off center to indicate a failure.

Additional objects and advantages of the invention will become apparent from the following description and accompanying drawings.

Designation of figures

Figure 1 is a face view of the indicator chosen for illustration of the invention and a connecting panel which may be used with it.

Figure 2 is a side view of the structure seen in Figure 1, the associated meter face plates being shown in section.

Figure 3 is a sectional view which may be taken on either of the lines 3—3 of Figure 2.

Figure 4 is a sectional view taken on the line 4—4 of Figure 2, with one partition panel only partly inserted.

Figure 5 is a circuit diagram representing a combined polyphase watt hour meter and thermal demand meter with the indicator of this invention applied to it.

General description

The indicator 11 of this invention may be used in conjunction with a combined polyphase meter having a polyphase watt hour unit represented by potential coils 12 and 13 and a polyphase thermal demand meter unit represented by potential coils 14 and 15 (Figure 5). The indicator is so associated with these coils that the indicator will indicate if any one of the four coils fails.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the part, improvements or combinations in which the inventive concepts are found.

Detailed description

Each of the potential coils 12 to 15 of the meter has one of four secondary coils 16 to 19 inductively associated with it, this secondary coil usually comprising a few turns of wire wound around a potential coil. Inasmuch as the potential coil is wound on an iron core for the purpose of performing its usual functions, it is apparent that an effective transformer condition exists and a small voltage will be generated in each of the secondary coils 16 to 19. Each of these secondary coils is connected in a closed circuit with one of the four heaters 22, 23, 24 and 25. Each heater is positioned close to one of two bi-metallic spiral coils 26 and 27.

The two bi-metallic coils 26 and 27 or thermal units are oppositely disposed. Both are anchored at their outer ends to a fixed anchor 28 and are secured at their inner ends to a shaft 29. A uniform rise in temperature such as that of the surrounding air will develop an equal tension in both of the thermal units 26 and 27. Because of their opposite disposition, these tensions will balance one another and the shaft 29 will not move. Likewise if the four heaters 22 and 25 are heated equally, they will heat the thermal units 26 and 27 equally and the tensions thus developed will balance one another so that the shaft will not move. However, if any one of the four heaters 22 to 25 should cease to be energized, the associated thermal unit 26 or 27 would cease to be heated to the same extent as the other and the greater tension of the more fully heated thermal unit 26 would turn the shaft 29. The shaft 29 carries a pointer or indicator member which is normally in a central or zero position but which, under the influence of the unbalanced condition which is described, will swing to one side or the other to indicate a failure.

For example, if lightning should strike wire A at some point outside of the meter installation and should cause a break in the circuit of coil 12, this coil would cease to function. The secondary coil 16 would cease to be energized. The heater 22 would cease to be heated and the bi-metallic spiral coil 26 would drop to a lower temperature than the bi-metallic coil 27, hence the pointer 31 would swing in one direction or the other. Assuming that the disposition of the bi-metallic coils is such that the pointer would swing to the left under this condition, the face 32 of the indicator may be marked on its left side with a legend such as "A—B Failure" to show that when the pointer shifts to the left the failure is in a coil connected across the wires A—B.

If the face 32 is thus marked then the heater 25 adjacent to the same thermal unit 26 as the heater 22 should be connected to the secondary coil 19 associated with the thermal meter potential coil 15 which is also connected across wire A—B. The other two heaters 23 and 24 are similarly responsive to potential coils 13 and 14, both of which are connected across wires B—C. If either coil 13 or coil 14 fails, bi-metallic spiral coil 27 will cool off somewhat and the pointer 31 will swing to the right, assuming that there has been no failure of coils 12 and 15.

Of course, theoretically, two coils could fail and leave the indicator balanced. Thus if coils 12 and 13 both failed, heaters 22 and 23 would cease to be energized and thermal units 26 and 27 would still be equally heated, the temperature of both being somewhat lower than normal. However, it is extremely rare for this condition to happen. As a matter of fact, this rare occurrence can be avoided by making the four heaters substantially unequal, but with the pairs adjacent one bi-metal equalling the other pair in heat developed. Then no two coils can fail and leave the bi-metals balanced.

Of course, if a catastrophe results in failure of all four coils 12 to 15, the meter will entirely cease to function and its stoppage will be detected by a meter reader, if enough is left of the meter to require such detection by the meter reader.

In some situations, it is desirable (regardless of the legend on face 32) to have the connections as shown in Figure 5 so that the one direction of deflection of the pointer 31 will correspond to failure concerning coils connected across A—B, while the other direction corresponds to failure of coils connected across wires B—C. This is particularly true where the wires leading to the meter are exposed so that they are likely to be struck by lightning. It may not be uncommon for lightning striking the wire A to burn out both coils 12 and 15. In other situations, however, where trouble due to lightning is very unlikely to occur, it may be preferred to have the direction of deflection of the pointer 31 indicate whether the failure is in the watt hour meter unit or in the thermal demand potential coils. This can be accomplished by shifting the connections so that heaters 22 and 25 are connected to be responsive to the watt hour potential 16 and 17 while heaters 23 and 24 are connected to be responsive to the thermal meter potential coils 14 and 15. To provide such flexibility and for facilitating the connections in any event, a connection panel 33 may be provided having terminals permanently connected to the heaters 22 to 25 and provided with terminal screws 34 for connection with leads from the secondary coils 16 to 19.

Constructional details

Of course it is desirable that the indicator unit be quite inexpensive in construction. This need is supplied by the simple construction shown in Figures 2 and 3. An end disc 41 is secured to meter face plate 42 as by screws 43. The end disc 41 carries a cylinder 44 which in turn carries a second end disc 46. The end discs 41 and 46 may be provided with simple bearing bushings 47 in which the shaft 29 is journaled. The pointer 31 is carried by hub 48 which is adjustably positioned on shaft 29 so that if necessary it may be reset at the zero or central position after a meter has been in operation a short time, in case there might be any slight unbalance in the heater operations.

Prior to assembly the bi-metallic coils 26 and 27 may be attached to shaft 29 in any convenient manner and also to the anchor blocks 28. In the course of assembly the shaft with its associated coils and anchor blocks will be inserted into cylinder 44 and the anchor blocks may then be drawn out and manipulated to slip the end portion of the bi-metallic coils into slots 49 opening from the ends of cylinder 44. The anchor blocks 28 may be secured to the cylinder in any desired manner, as by screws. The cylinder 44 may be divided into two chambers by inserting partition inserts 51 through slots 52 in opposite sides of the cylinder 44. It is not necessary for these partition inserts to be air tight. It is sufficient if they cooperate to substantially shut off convection currents from one chamber within cylinder 44 to the other. The U-shaped resistance wire heaters 22 to 25 may next be threaded through openings in the housing so that their separate ends project from the housing, and lead wires may be soldered to these ends. Thereafter the end discs 41 and 46 may be secured to the cylinder 44 in any suitable manner, as by adhesive.

It is thus seen that a very simple thermal unit is provided which can be manufactured at a very low cost. Obviously, various changes may be made in the construction and no doubt some will result in further economies. Of course, any type of thermal unit having the indicated characteristics could be used.

If there should be occasions when a remote control or indication should be desired, the form of pointer illustrated could be replaced by one in the form of a contact device which would close circuits for remote indications or controls. Such a contact device would itself serve as an indicator to any who chose to look at it or it might be deemed an element of the entire remote control apparatus and hence be deemed a telltale element, this term also being broad enough to cover the illustrated pointer.

I claim:

1. An indicator mechanism in combination with a meter mechanism having an even number of meter coils wound on cores, said indicator mechanism including a secondary coil in inductive relation to each of said meter coils, a heater connected to each secondary coil, a movable indicator and a pair of opposed heat responsive members associated with said indicator to move it when differentially varied in temperature; said heat responsive members being associated with different ones of said heaters to be separately heated by them, when all of the meter coils are functioning, to position the indicator at a predetermined position indicating that all of said coils are functioning.

2. A telltale mechanism in combination with a plurality of coils, each having a function the continuance of which is to be guarded by the mechanism, said mechanism including a secondary coil in inductive relation to each of said coils, a heater energized by each secondary coil, a movable telltale element and a pair of opposed heat responsive members associated with said element to move it when differentially varied in temperature; said heat responsive members being associated with different ones of said heaters to be separately heated by them.

3. A telltale mechanism in combination with a plurality of coils, each having a function the continuance of which is to be guarded by the mechanism, said mechanism including a secondary coil in inductive relation to each of said coils, a heater energized by each secondary coil, a movable telltale element and a pair of opposed heat responsive members associated with said element to move it when differentially varied in temperature; and associated with said heaters to be separately heated by different ones of them, said heaters being designed to heat the two heat responsive elements equally when the first named coils are normally energized.

4. A telltale mechanism in combination with a plurality of coils, each having a function the continuance of which is to be guarded by the mechanism, said mechanism including a secondary coil in inductive relation to each of said coils, a heater energized by each secondary coil, a movable telltale element and a pair of opposed bimetallic coils associated with said element to move it when differentially varied in temperature; and said bimetallic coils being associated with different ones of said heaters to be separately heated by them, and said heaters being designed to heat the two bimetallic coils equally when the first named coils are normally energized.

5. A telltale mechanism in combination with a plurality of coils, each having a function the continuance of which is to be guarded by the mechanism, one pair of coils being connected across one pair of terminals for connection in an electrical circuit and another pair of the coils being connected across another pair of such terminals, said mechanism including a secondary coil in inductive relation to each of said coils, a heater energized by each secondary coil, a movable telltale element, and a pair of opposed heat responsive elements associated with said element to move it when differentially varied in temperature; said heat responsive elements being associated with different ones of said heaters to be separately heated by the heaters energized by the different pairs of coils.

6. A thermal indicator including a movable telltale element, a pair of heat responsive members oppositely associated in driving relation with the element for mutual compensation as to ambient temperature changes and when heated alike, and heater means associated with each heat responsive member for connection to be responsive to current flowing through meter coils, said element being associated with said heat responsive members to assume an intermediate position in its range of movement when the meter coils are all normally energized and when they are all deenergized, and otherwise to be deflected by the heat responsive members in either direction from said intermediate position.

7. A thermal indicator including a movable telltale element, a pair of heat responsive members oppositely associated in driving relation with the element for mutual compensation as to ambient temperature changes and when heated alike, and heater means associated with each heat responsive member for connection to be responsive to current flowing through meter coils, said element being associated with said heat responsive members to assume an intermediate position in its range of movement when the heaters are all de-energized.

8. A thermal indicator including a movable telltale element, a pair of heat responsive members oppositely associated in driving relation with the element for mutual compensation as to ambient temperature changes and when heated alike, and a pair of heaters associated with each heat responsive member, each of said heaters being connected in a separate circuit, said element being associated with said heat responsive members to assume an intermediate position in its range of movement when the heaters are all de-energized.

9. A thermal indicator including a movable telltale element, a pair of heat responsive members oppositely associated in driving relation with the element for mutual compensation as to ambient temperature changes and when heated alike, and a pair of heaters associated with each heat responsive member, each of said heaters being connected in a separate circuit, a secondary coil in each of said circuits for energizing its associated heater, said element being associated with said heat responsive members to assume an intermediate position in its range of movement when the heaters are all de-energized.

10. A thermal indicator including a slotted tubular housing of insulating material, end closures carried by the housing, a shaft journaled in said end closures and extending axially through the housing, indicator means controlled by said shaft, a pair of bimetallic coils within the housing oppositely associated with the shaft for mutual compensation as to ambient temperature changes and when heated alike, partition means inserted through said housing where it is slotted to divide the housing into two chambers each containing a bimetallic coil, heaters in each of said chambers comprising a U shaped resistance wire passed through said housing from the outside thereof and having its ends exposed externally thereof.

11. A thermal indicator including a slotted tubular housing of insulating material, end closures carried by the housing, a shaft journaled in said end closures and extending axially through the housing, indicator means controlled by said shaft, a pair of bimetallic coils within the housing oppositely associated with the shaft for mutual compensation as to ambient temperature changes and when heated alike, partition means inserted through said housing where it is slotted to divide the housing into two chambers each containing a bimetallic coil, heaters in each of said chambers comprising a resistance wire passed through said housing from the outside thereof and having its ends exposed externally thereof.

12. A thermal device including a tubular housing of insulating material, a bimetallic coil within the housing in a position fixed axially of the housing, a heater for the coil comprising a U-shaped resistance wire having its legs passed through the housing from the outside thereof with the ends of the legs exposed externally of the housing and with the heater accurately positioned by engagement of the legs with the housing at both ends of both legs.

References Cited in the file of this patent

UNITED STATES PATENTS

| Number | Name | Date |
|---|---|---|
| 1,300,283 | Lincoln et al. | Apr. 15, 1919 |
| 1,960,848 | Jones | May 29, 1934 |
| 2,571,938 | Petzinger | Oct. 16, 1951 |

FOREIGN PATENTS

| Number | Country | Date |
|---|---|---|
| 363,967 | Great Britain | Dec. 31, 1931 |